(12) United States Patent
Melvin

(10) Patent No.: US 7,606,942 B1
(45) Date of Patent: *Oct. 20, 2009

(54) METHOD FOR INPUT OUTPUT EXPANSION IN AN EMBEDDED SYSTEM UTILIZING CONTROLLED TRANSITIONS OF FIRST AND SECOND SIGNALS

(76) Inventor: Stephen Waller Melvin, One Market St., Spear Tower, Suite 3600, San Francisco, CA (US) 94105

( * ) Notice: Subject to any disclaimer, the term of this patent is extended or adjusted under 35 U.S.C. 154(b) by 0 days.

This patent is subject to a terminal disclaimer.

(21) Appl. No.: 12/049,681

(22) Filed: Mar. 17, 2008

Related U.S. Application Data

(63) Continuation of application No. 10/709,084, filed on Apr. 12, 2004, now Pat. No. 7,346,710.

(51) Int. Cl.
*G06F 3/00* (2006.01)
*G06F 13/00* (2006.01)

(52) U.S. Cl. .............. 710/2; 710/8; 710/9; 710/10; 710/29; 710/106; 710/300; 713/600

(58) Field of Classification Search ............... 710/2, 710/8–10, 29, 106, 300; 713/600
See application file for complete search history.

(56) References Cited

U.S. PATENT DOCUMENTS

| 4,689,740 A | 8/1987 | Moelands |
| 6,874,050 B2 | 3/2005 | Tangen |

*Primary Examiner*—Tammara Peyton
(74) *Attorney, Agent, or Firm*—Knobbe, Martens, Olson & Bear LLP

(57) ABSTRACT

A method for expanding input/output in an embedded system is described in which no additional strobes or enable lines are necessary from the host controller. By controlling the transitions of the signal levels in a specific way when controlling two existing data or select lines, an expansion input and/or output device can generate a strobe and/or enable signal internally. This internal strobe and/or enable signal is then used to store output data or enable input data. The host controller typically utilizes software or firmware to control the data transitions, but no additional wires are needed, and no changes are needed to existing peripheral devices. Thus, an existing system can be expanded when there are no additional control lines available and no unused states in existing signals.

17 Claims, 9 Drawing Sheets

METHOD FOR INPUT OUTPUT EXPANSION IN AN EMBEDDED SYSTEM UTILIZING CONTROLLED TRANSITIONS OF FIRST AND SECOND SIGNALS

RELATED APPLICATIONS

This application is a continuation of application Ser. No. 10/709,084, filed on Apr. 12, 2004, now U.S. Pat. No. 7,346,710, issued on Mar. 18, 2008, which is incorporated herein by reference.

FIELD OF THE INVENTION

This invention relates to the field of embedded systems, and more specifically to peripheral devices coupled to host controllers within embedded systems, and mechanisms for expanding the input and/or output within existing designs.

BACKGROUND

Embedded systems typically incorporate a host microprocessor or microcontroller coupled to peripherals devices. Typically, signals coupled between the microcontroller and the peripheral are used for the input of data from such peripherals and for the output of data to such peripherals. These data signals can be directly wired to the microcontroller or there can be intervening buffers or registers. Typically certain of these signals are control signals, such as enable signals or strobe signals, which indicate to the peripheral when to perform data input or output respectively. Alternatively, control signals can be implemented in the form of select lines, which are used to indicate to the peripheral how to interpret other signals.

A problem that arises with embedded systems is the need to expand the I/O beyond the number for which it was originally designed. For example, it may be necessary to add an additional eight output signals to an embedded system that was only designed with the consideration of handling 16 output signals. Unless there are unused control signals that can be utilized for such an expansion, significant changes may be required, including substantial redesign and additional wires. In the case of select lines, expansion is sometimes simplified if there are unused states, but often all states have been defined and are utilized by existing peripherals. Again this means that a significant redesign effort may be required.

Accordingly, it would be desirable to have a mechanism to expand the I/O capabilities of an embedded system without requiring any additional control signals and without requiring that there are any unused states in existing control signals.

SUMMARY

The present invention expands the input and/or output of an embedded system without requiring any new control signals or requiring that there be any unused states on existing signals. The expansion apparatus is coupled to an embedded system including a host microcontroller and existing peripherals.

In one embodiment, output expansion incorporates a logic circuit coupled to two existing signals and an output register. The logic circuit generates a strobe signal in response to a direct transition from one state to another state of the two signals. The host controller is programmed such that no such direct transition takes place when input/output is being performed to existing peripherals. Further, the host controller is programmed to generate the direct transition detected by the logic circuit when expansion output is being performed. This means that when a transition between the two states is needed to satisfy the existing peripheral, the host controller ensures that the signals sequence through other states and do not go directly between the two states that are detected by the logic circuit.

In another embodiment, input expansion incorporates a logic circuit coupled to two existing signals and an input buffer. The logic circuit activates an enable signal in response to a direct transition from one state to another state of the two signals, and to deactivate the enable signals in response to a transition to a third state of the two signals. As with output expansion, the host controller is programmed such that the first detected direct transition will not take place when input/output is being performed to existing peripherals. Additionally, the host controller is programmed to generate the two transitions detected by the logic circuit when expansion input is being performed.

DRAWINGS

DETAILED DESCRIPTION

Figure 1:
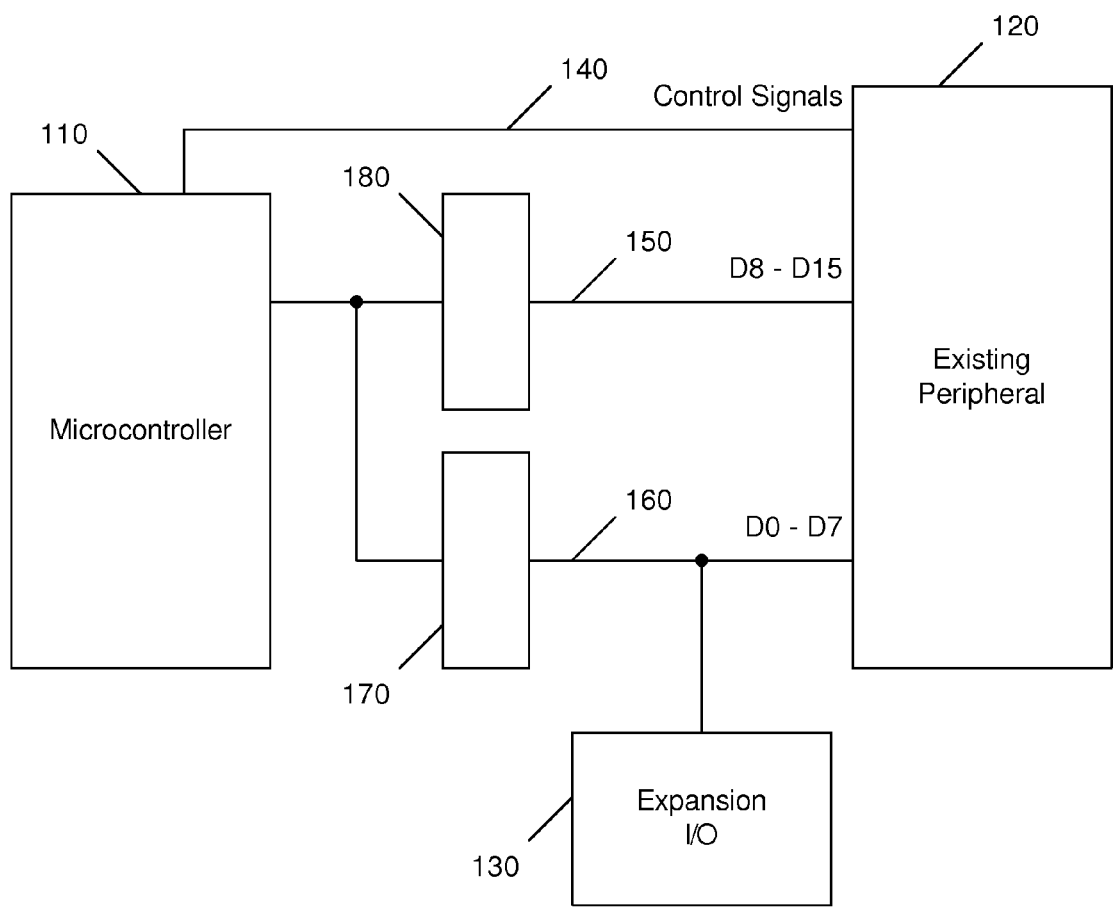
FIG. 1 illustrates an embedded system incorporating an embodiment of the present invention.

FIG. 1 illustrates an embedded system in which the present invention can be incorporated. Host 110 is the host microprocessor or microcontroller responsible for controlling the main functions of the embedded system. Existing peripheral 120 is one or more existing input or output devices. Data signals 150 and 160 are 16 signals that are utilized by existing peripheral 120 for output of data from host 110 or input of data to host 110. Elements 180 and 170 can be output registers, input buffers, or bidirectional elements incorporating both registers and buffers. Control signals 140 are strobe, enable or select lines that are utilized to communicate between host 110 and existing peripheral 120.

Expansion I/O device 130 provides additional output signals and is coupled only to data lines 150 and 160 of the embedded system and not to any control signals 140. As will be described in detail below, strobe and enable signals are generated internal to expansion I/O device 130 based on the sequencing of data on data lines 150 and 160. The present invention allows expansion I/O device 130 to operate in the embedded system of FIG. 1 with no additional wiring and no changes to existing peripheral 120. Changes are only needed to the firmware and/or software that controls the sequencing of data from microcontroller 110. The only requirement is that expansion I/O device 130 be coupled to two signals that are continuously driven by host 110 and that existing peripheral 120 is not sensitive to the sequencing of data on those signals. It is not necessary that those two signals are not fully utilized by existing peripheral 120.

Figure 2A:
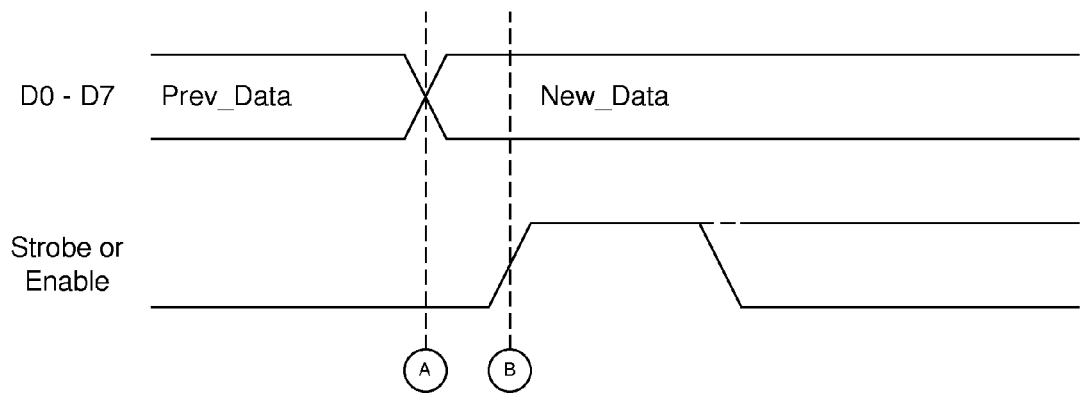
FIG. 2A illustrates a prior art timing diagram for data input or output.

FIG. 2A illustrates prior art data sequencing for the host microcontroller 110 performing data output. Signals D0 through D7, and the Strobe or Enable signal are coupled to host 110 and to existing peripheral 120. In order to output data to existing peripheral 120, host microcontroller 110 changes the data on signals D0 through D7 and then generates a transition on the Strobe signal. This can be illustrated as the sequence:

A: OUT←New_Data<7:0>
B: STROBE

The steps A and B correspond to the dotted lines labeled A and B in FIG. 2A. Alternatively, to read data from existing peripheral 120, host 110 activates the enable signal, reads the data on signals D0 through D7 and then deactivates the enable signal.

Figure 2B:
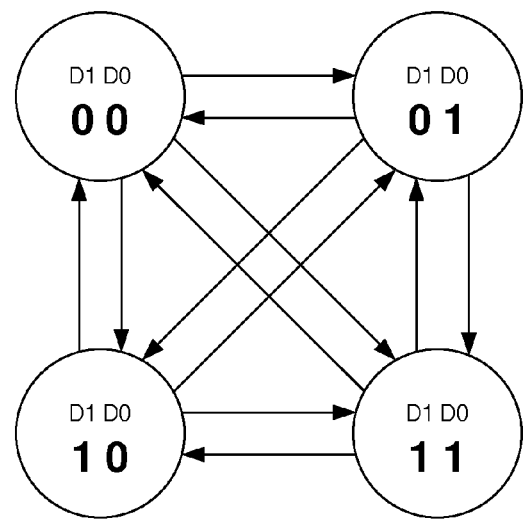
FIG. 2B illustrates a prior art state transition diagram for data input or output.

FIG. 2B illustrates the state sequencing of the two least significant signals D0 and D1 in the group D0 through D7. FIG. 2 illustrates that since there are no restrictions on the contents of the data previously on signals D0 and D1 with respect to the new state of signals D0 and D1, all state transitions are possible. That is, when host microcontroller 110 changes the state of signals D0 and D1 from the previous state to the new state at step A, a transition from any of the four possible previous states to the four possible new states can take place.

The principle of the present invention is that by applying special constraints to the sequencing of existing data output, some of the arcs illustrated in the transition diagram of FIG. 2B can be eliminated. The existing peripheral is not affected by the modification to the sequencing because no states are eliminated, only arcs. That is, the existing peripheral waits for the strobe signals before it latches output data, so it does not care if state transitions are not direct and go through other states. Thus, arbitrary data can still be written to existing output devices. However, this elimination of some of the arcs associated with existing data output means that one or more arcs can be reserved for expansion data input and output. This concept will now be illustrated in detail in connection with various embodiments.

Figure 3A:
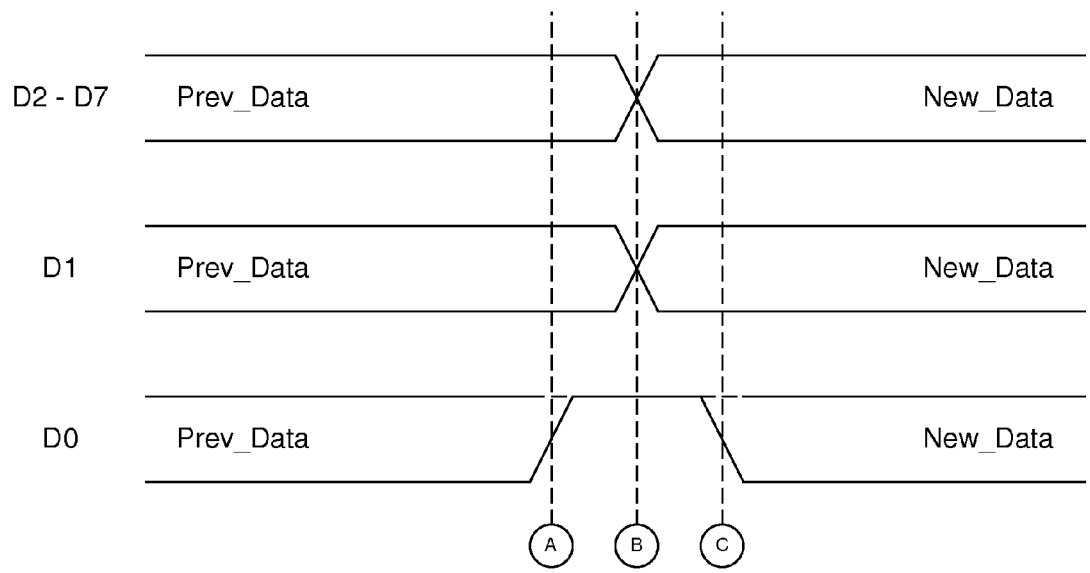
FIG. 3A illustrates a timing diagram for an embodiment the present invention performing data input or output on existing peripherals.

Referring now to FIG. 3A, the changes necessary for existing data output are illustrated. FIG. 3A illustrates a timing diagram for how data is sequenced in connection with a write from host microcontroller 110 to existing peripheral 120. The basic concept behind FIG. 3A is that host microcontroller 110 is programmed to prevent D1 from changing states when D0 is low. That is, D1 is allowed to change states only when D0 is high. To guarantee this requires a three step sequence that can be described as follows:

A: OUT←Prev_Data<7:1> '1
B: OUT←New_Data<7:1> '1
C: OUT←New_Data<7:0>

Note that the single quote character, ', refers to the concatenation operation. The steps A, B and C correspond to the dotted lines labeled A, B and C respectively in FIG. 3A. These three steps can be considered a modification of the individual step A from FIG. 2A. That is, rather than just writing out the new data in one step, as is performed by the prior art and is illustrated in FIG. 2A, a new three-step sequence is used.

Figure 3B:
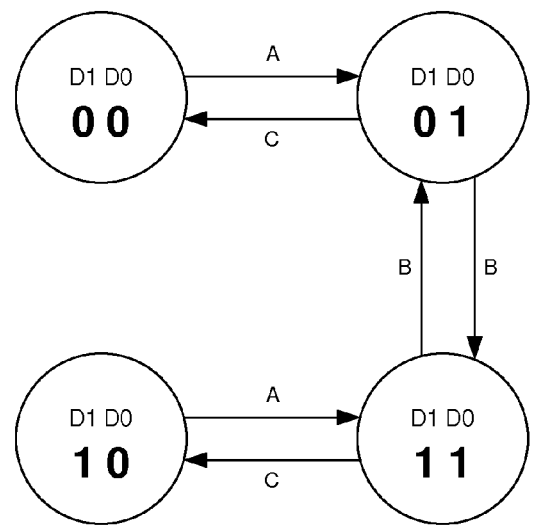
FIG. 3B illustrates a state transition diagram for an embodiment of the present invention performing data input or output on existing peripherals.

By performing this three-step sequence when data is written to output signals D0 and D1, certain state transition arcs that were present in FIG. 2B are no longer present. This is illustrated in FIG. 3B. The arcs are labeled with A, B and C based on the steps that they correspond to from FIG. 3A and described above. Note that regardless of which of the four states is the original state, and which of the four states is the final state, there are no transitions between the 00 state and the 10 state. Thus all states are accessible and no changes are needed to existing peripheral 120 for it to operate in the new configuration as illustrated in FIGS. 3A and 3B from its previous operation in the prior art configuration as illustrated in FIGS. 2A and 2B.

While the three-step sequence of FIG. 3A is longer than the single step of FIG. 2A, in many cases the additional time and complexity are negligible. If the time for the additional instructions and cycles is small compared to the frequency with which the data signals are changed, the overhead imposed would be small. In some cases, host microcontroller 100 may need to save the state of the previous data in an internal register so that it can change only D0 without affecting D1. Note that the steps A, B and C described above can consist of explicit actions that are always taken, regardless of the values of the previous and new data, or alternatively, they could be actions that are taken conditional on them being necessary. For example, if the previous state of D0 is a logic high, then A need not actually be performed. In one embodiment, host microcontroller 110 would test the previous state of D0 and only take step A if necessary. In some cases this may be preferable than always executing step A even when not necessary.

In an alternative embodiment, rather than having host microcontroller 110 perform the three-step sequence of FIG. 3A as an instruction sequence, dedicated hardware could perform this sequencing. In this case, the dedicated hardware would need a way to know if a change in output signals were being made for the purpose of supporting an existing peripheral and would go through the sequence discussed above.

Figure 4A:
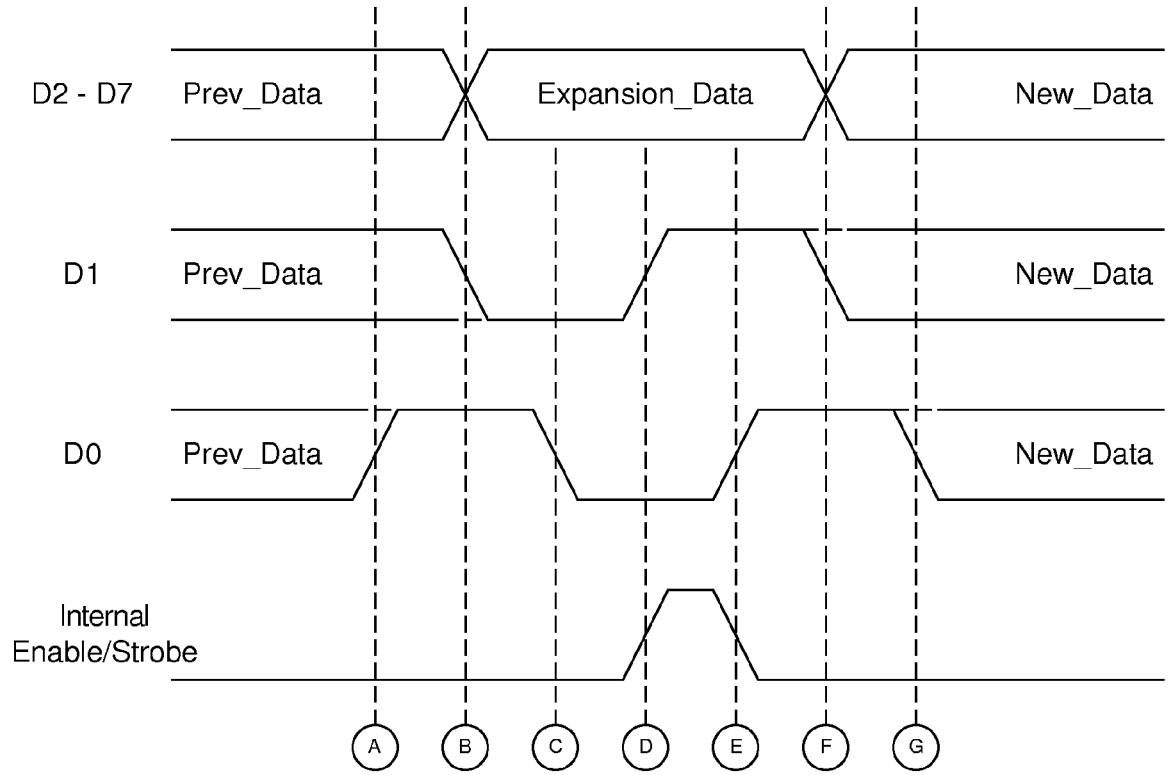
FIG. 4A illustrates a timing diagram for an embodiment of the present invention performing expansion data input or output.

Modifying the existing output from host microcontroller 110 so that certain state transition arcs are eliminated is only the first half of the present invention. The second half is to cause one or more of those eliminated arcs to take place when expansion data is output or input. FIG. 4A illustrates one embodiment of such a mechanism. The steps in FIG. 4A can be described as follows:

A: OUT←Prev_Data<7:1> '1
B: OUT←Expansion_Data<7:2> '1
C: OUT←Expansion_Data<7:2> '00
D: OUT←Expansion_Data<7:2> '10
E: OUT←Expansion_Data<7:2> '11
F: OUT←New_Data< 7:1> '1
G: OUT←New_Data<7:0>

Figure 4B:
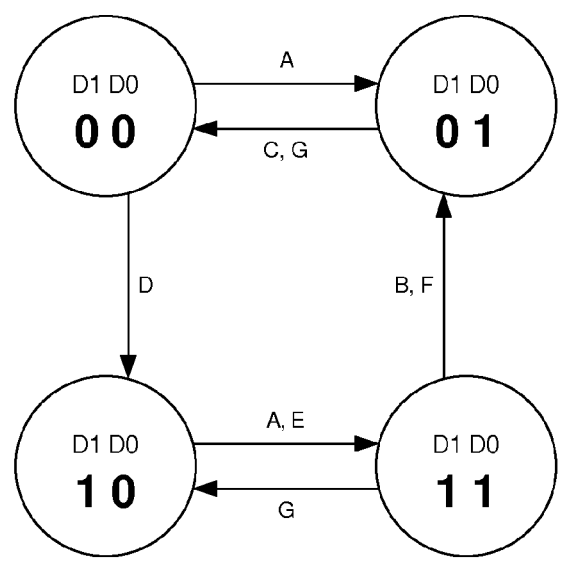
FIG. 4B illustrates a state transition diagram for an embodiment of the present invention performing expansion data input or output.

The steps A through G correspond to the dotted lines labeled A through G respectively in FIG. 4A. The seven-step sequence of FIG. 4A guarantees that the step labeled D, which is the state transition from the state 00 to the state 10 takes place in a controlled manner. FIG. 4B illustrates the state transition diagram for the timing diagram of FIG. 4A with the arcs labeled with the steps to which they correspond.

By setting up the expansion output data on signals D2 through D7, and then sequencing the signals D0 and D1 to generate the transition of step D, expansion output of data is accomplished. It is then only necessary for dedicated circuitry present in expansion I/O device 130 to recognize this transition and generate an internal strobe signal that can be used to latch the data on signals D2 through D7. The use of the high six bits in an eight bit output is only one of many possible embodiments. In an alternative embodiment, more than six bits of output are accommodated by latching other signals, for example data bits D8 through D15 from host microcontroller 110. It would also be possible to utilize two other signals output from host 110 besides D0 and D1. It is only necessary that the data lines utilized are controlled by a single source, so that the transitions on them can be controlled. Note that as describe above with reference to FIG. 3, some embodiments may test the previous and new states of D0 and D1 and only take action when necessary. For example, if the new state of D0 is a logic high, then there is nothing to do at step G, so it can be eliminated.

It is also important to note that step E can be used to signal the end of the expansion I/O cycle. This allows the internally generated signal to be used as a buffer output enable for the input of expansion data. Thus, rather than putting data on signals D2 through D7, host microcontroller can float those signals and read the contents of the signals at step E which would be sourced by the expansion I/O device. In alternative embodiments, both input and output of data can be accomplished by utilizing an additional signal to indicate the direction of data flow. For example, D2 could be utilized by expansion I/O device 130 so that if it is low at the time corresponding to step D in FIG. 4A, an output cycle is generated, while if it is high, an input cycle in initiated. It would also be possible, in alternative embodiments, to utilize the state transition arc going in the opposite direction, from state 10 to state 00, instead of or in addition to the arc going from state 00 to state 10. Since both of these arcs were eliminated in the sequence illustrated in FIGS. 3A and 3B, either or both could be used to accomplish the present invention.

Figure 5A:
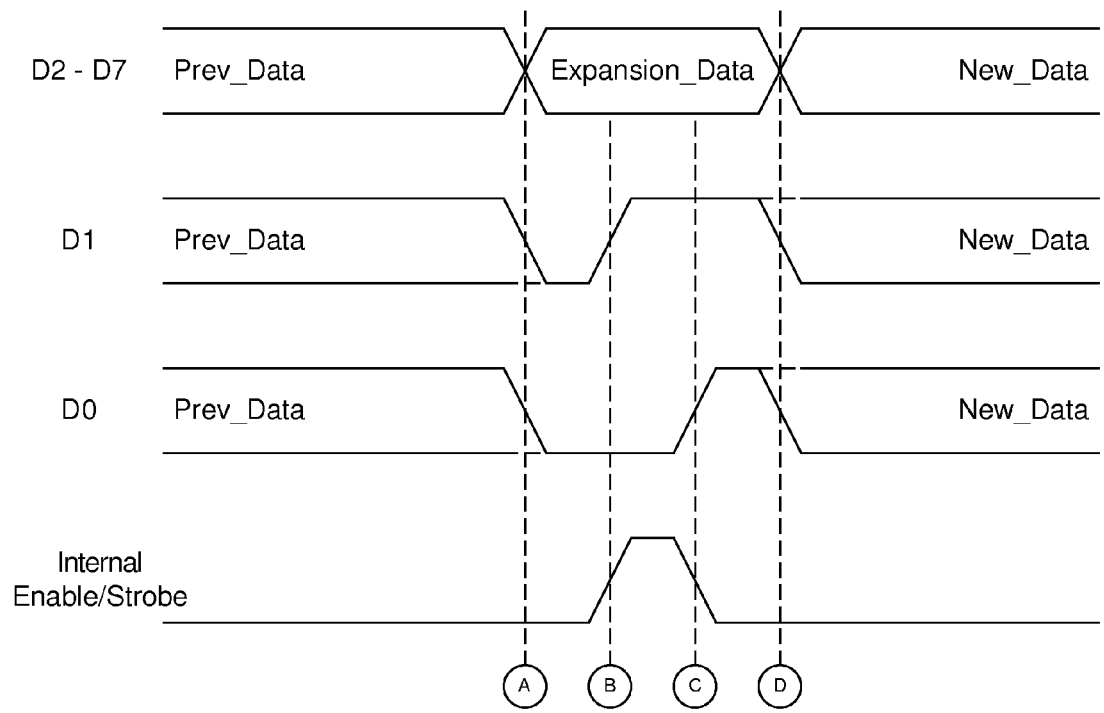
FIG. 5A illustrates a timing diagram for an embodiment of the present invention performing expansion data input or input or output.

FIG. 5A illustrates a simplified sequencing of steps that can be used for expansion I/O. The seven steps of FIG. 4A can be replaced in certain circumstances with four steps that can be described as follows:

A: OUT←Expansion_Data<7:2> '00
B: OUT←Expansion_Data<7:2> '10
C: OUT←Expansion_Data<7:2> '11
D: OUT←New_Data<7:0>

Figure 5B:
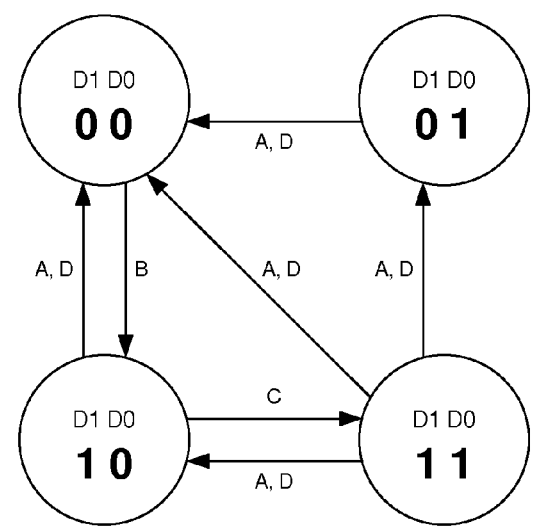
FIG. 5B illustrates a state transition diagram for an embodiment of the present invention performing expansion data input or output.

The steps A through D correspond to the dotted lines labeled A through D respectively in FIG. 5A. The four-step sequence of FIG. 5A guarantees that the step labeled B, which is the state transition from the state 00 to the state 10 takes place in a controlled manner. FIG. 5B illustrates the state transition diagram for the timing diagram of FIG. 5A with the arcs labeled with the steps to which they correspond.

The reason that the seven steps of FIG. 4A can be replaced by the four steps of FIG. 5A is that the assumption is made in FIG. 5A that signals are sufficiently free from noise that they do not experience bounce as detected by the expansion I/O circuit. That is, the assumption is made that when a signal changes state, going from either high to low or low to high, it does so in a way that allows it to be detected as a single, clean, transition. The validity of this assumption depends on the hysteresis and frequency response of the expansion I/O circuit, the noise on the data signals as well as other factors. This assumption can often be safely made in well-designed digital systems and significantly simplifies the burden on host 110.

Note that the embodiment of FIG. 4A does not make the no-bounce assumption. If each transition of FIG. 4A bounces, it will still be the case that the 00 to 10 transitions take place at a single point and in a controlled manner. This is because there is no step in FIG. 4A in which both D0 and D1 are changing states at the same time. FIG. 5A, by contrast, has the property that both D0 and D1 are potentially changing states in steps A and D. However, it is important to note that although the embodiment illustrated in FIG. 5A does make the no-bounce assumption, it does not make that assumption that D0 and D1 change states at the same time in steps A and D, as this is generally difficult if not impossible to guarantee. For example, if the previous states of D0 and D1 were 11, step A would change both of these states to 00. The change from 11 to 00 could be detected as a change from 11 to 10 to 00, or from 11 to 01 to 00, or directly from 11 to 00. Each of these possibilities is contemplated by the embodiment of FIG. 5A. But the no-bounce assumption guarantees that there are no spurious transitions, and thus that the 00 to 10 transition occurs only in step B, when host 110 is ready.

Figure 6A:
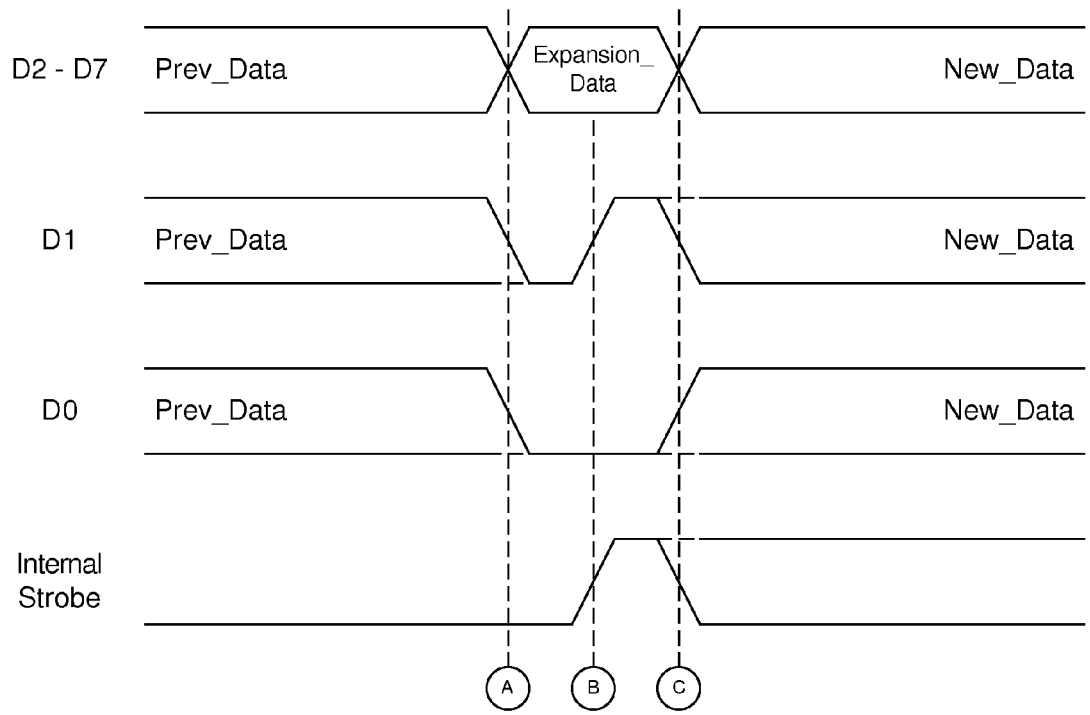
FIG. 6A illustrates a timing diagram for an embodiment of the present invention performing expansion data output.

FIG. 6A illustrates a further simplified sequencing of steps that can be used for expansion output. The four steps of FIG. 5A can be replaced in certain circumstances with three steps that can be described as follows:

A: OUT←Expansion_Data<7:2> '00
B: OUT←Expansion_Data<7:2> '10
C: OUT←New_Data<7:0>

Figure 6B:
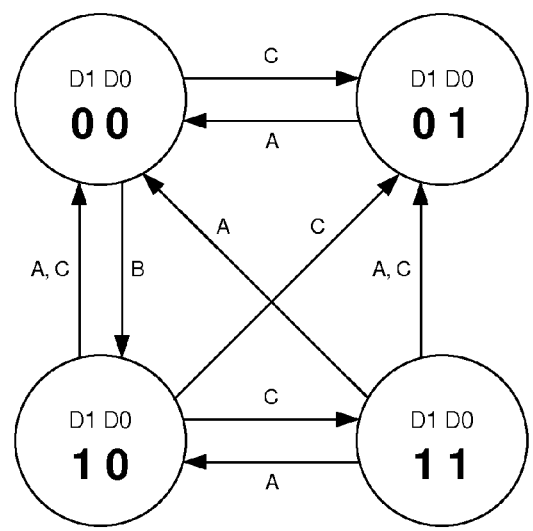
FIG. 6B illustrates a state transition diagram for an embodiment of the present invention performing expansion data output.

The steps A, B and C correspond to the dotted lines labeled A, B and C respectively in FIG. 6A. As with FIG. 5A, the three-step sequence of FIG. 6A guarantees that the step labeled B, which is the state transition from the state 00 to the state 10 takes place in a controlled manner. FIG. 6B illustrates the state transition diagram for the timing diagram of FIG. 6A with the arcs labeled with the steps to which they correspond.

The simplification of FIG. 6A is that the step utilized for indicating the end of the expansion I/O sequence has been eliminated. Thus, if the new states of D0 and D1 are equal to 0 and 1 respectively, the will be no change in state at step C, and the expansion circuit will have no indication that the expansion cycle has ended. This is not a problem for data output, since the expansion circuit is only concerned with generating a strobe, but it will not work for data input, since in that case it is necessary for an enable signal to stop data input at the end of the expansion cycle. Thus, the embodiment described by FIG. 6A can only be used for expansion data output.

Figure 7:
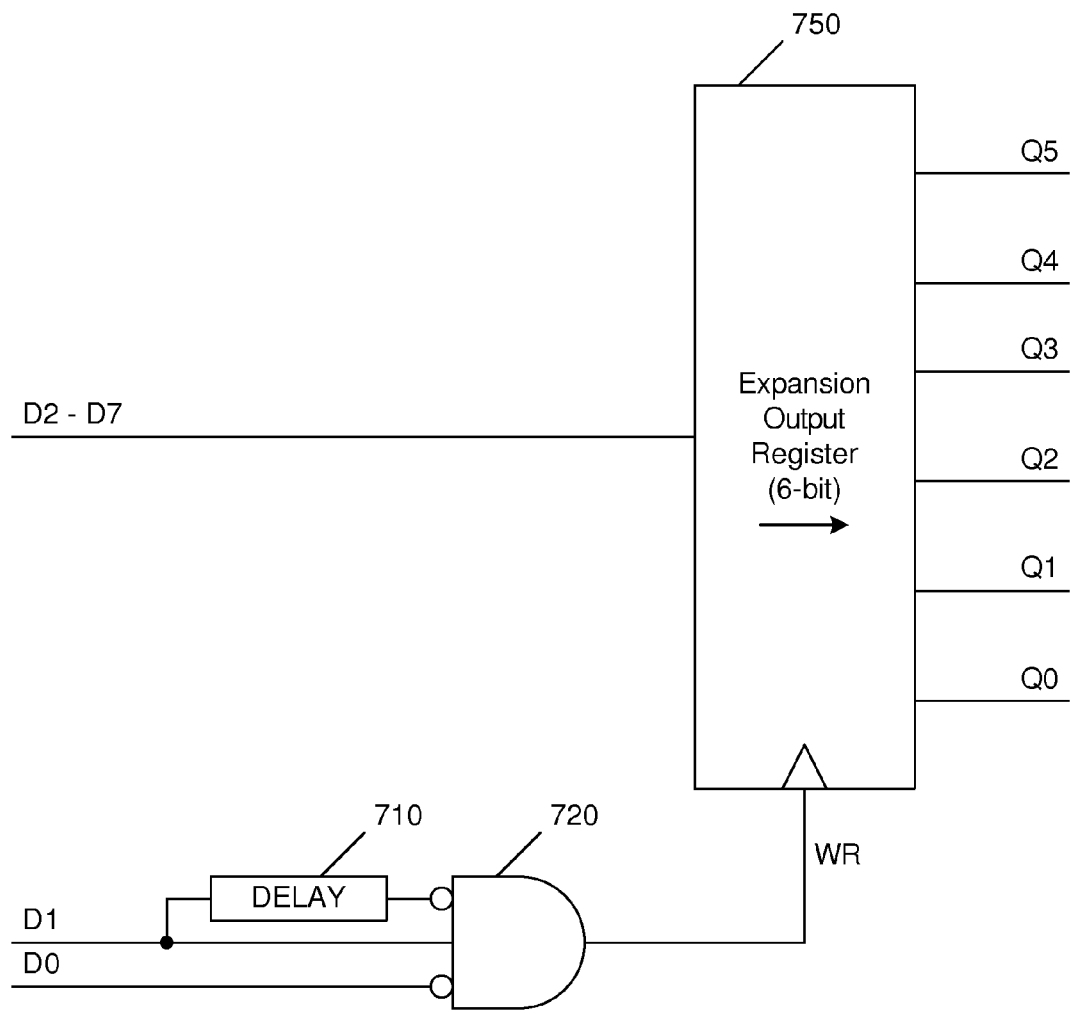
FIG. 7 illustrates a circuit for performing expansion data output in an embodiment of the present invention.

FIG. 7 illustrates an embodiment of the present invention in which six bits of data output are provided. The data inputs to register 750 are coupled to six data lines D2 through D7 from host microcontroller 110. The data outputs from register 750 are coupled to expansion output signals Q0 through Q5. Data line D1 from host 110 is coupled to the input of delay element 710 and to an inverting input of AND gate 720. Data line D0 from host microcontroller 110 is coupled to an inverting input of AND gate 720. The output of delay element 710 is coupled to an input of AND gate 720. The output of AND gate 720 is coupled to the clock input of register 750. AND gate 720 performs the logical function that can be written as: /D0*D1*/(DELAYED_D1). That is, the output of AND gate 720 is high when and only when D0 is low, D1 is high and the output of delay element 710 is low.

The function of delay element 710 and AND gate 720 in FIG. 7 is to detect the positive going edge of D1 when D0 is low. This corresponds to the 00 to 10 state transition that is labeled step D in FIG. 4A and step B in FIGS. 5A and 6A. When this transition occurs the output of AND gate 720 will momentarily go high. AND gate 720 will only go high at this point and will not go high at any other step of FIG. 3A, 4A, 5A or 6A, no other step satisfies the circuit conditions. The fact that no step in FIG. 3A will cause a high output on AND gate 720 means that host microcontroller 110 can output data to existing peripheral 120 without affecting output register 750. Thus, arbitrary output to existing peripherals does not affect expansion peripherals.

The delay through delay element 710 must be chosen long enough to allow the output of AND gate 720 to fully transition low to high sufficient to cause output register 750 to be clocked. The length of the low to high to low transitions from AND gate 720 is approximately the length of time for a signal to propagate through delay element 710. The actual time depends on factors such as the minimum and maximum propagation delays, the associated rise and fall times, the input thresholds and the loading on the outputs of delay element 710 and AND gate 720. In practice, delay element 710 and AND gate 720 must be designed carefully to guarantee a reliable positive edge on the output of AND gate 720 in all cases.

Figure 8:
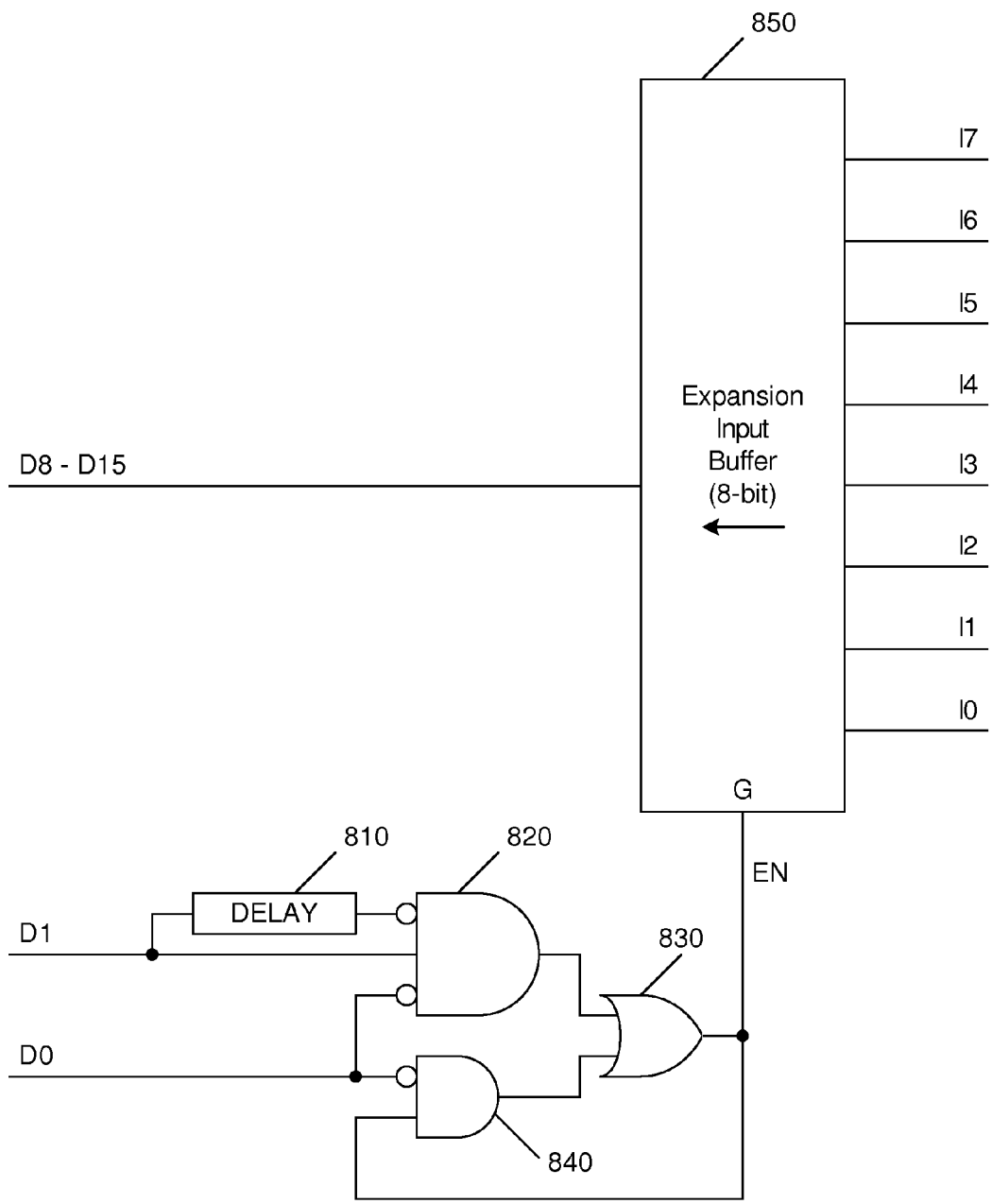
FIG. 8 illustrates a circuit for performing expansion data input in an embodiment of the present invention.

FIG. 8 illustrates an embodiment of the present invention in which eight bits of data input are provided. The data outputs from buffer 850 are coupled to eight data lines D8 through D15 to host 110. The data inputs to buffer 850 are coupled to expansion input signals 10 through 17. Data line D1 from host 110 is coupled to the input of delay element 810 and to an inverting input of three-input AND gate 820. Data line D0 from host 110 is coupled to an inverting input of three-input AND gate 820 and to an inverting input of two-input AND gate 840. The output of delay element 810 is coupled to an input of three-input AND gate 820. The output of three-input AND gate 820 is coupled to an input of OR gate 830. The output of two-input AND gate 840 is coupled to an input of OR gate 830. The output of OR gate 830 is coupled to the enable input of buffer 850 and to an input of two-input AND gate 840.

Three-input AND gate 820 performs the logical function that can be written as: /D0*D1*/(DELAYED_D1). That is, the output of three-input AND gate 820 is high when and only when D0 is low, D1 is high and the output of delay element 810 is low. Two-input AND gate 840 performs the logical function that can be written as: /D0*EN. That is, the output of two-input AND gate 840 is high when D0 is low and EN (the output of OR gate 830) is high. OR gate 830 performs the logical function that is the logical OR of its inputs. That is, the output of OR gate 830 is high when either of its inputs are high.

The function of delay element 810 and three-input AND gate 820 in FIG. 8 is the same as the corresponding circuit elements 710 and 720 in FIG. 7, i.e. to detect the positive going edge of D1 when D0 is low. This corresponds to the 00 to 10 state transition that is labeled step D in FIG. 4A and step B in FIGS. 5A and 6A. The additional circuit elements two-input AND gate 840 and OR gate 830 are to latch the state of the output of three-input AND gate 820 until D0 goes high. This feature causes the output of OR gate 830, which is the signal labeled EN in FIG. 8, so stay high until the 10 to 11 state transition, which is the labeled step E in FIG. 4A and step C in FIG. 5A.

The delay through delay element 810 must be chosen long enough to allow the output of OR gate 830 to transition low to high and to allow the feedback path through two-input AND gate 840 to latch the signal in the high state. This means that the minimum propagation delay through delay element 810 must be greater than the sum of the maximum propagation delays through three-input AND gate 820, OR gate 830 and two-input AND gate 840. In practice, delay element 810 and gates 820, 830 and 840 must be designed carefully to guarantee that the 00 to 10 transition is latched reliably in all cases.

Note that the circuit shown in FIG. 8 can be used with expansion output as well as expansion input. That is, delay element 810 and gates 820, 830 and 840 could replace delay element 710 and gate 720 in FIG. 7. The positive going edge on the output of OR gate 830 would then be used to clock register 750. In practice, this may present a more robust and reliable design even if the high to low transition on the output of OR gate 830 is ignored. This is because the circuit of FIG. 8 may have more simplified design constraints on delay element 810.

Even in the case of a FIG. 6A data sequencing embodiment, which works for data output only, a circuit utilizing delay element 810 and gates 820, 830 and 840 in conjunction with register 750 can be utilized. In that case, the high to low transition on the output of OR gate 830 may not occur until a subsequent data output, which may be much later in time than the sequence of FIG. 6A. This will not be important for data output as only the low to high transition is needed to clock register 750.

Figure 9:
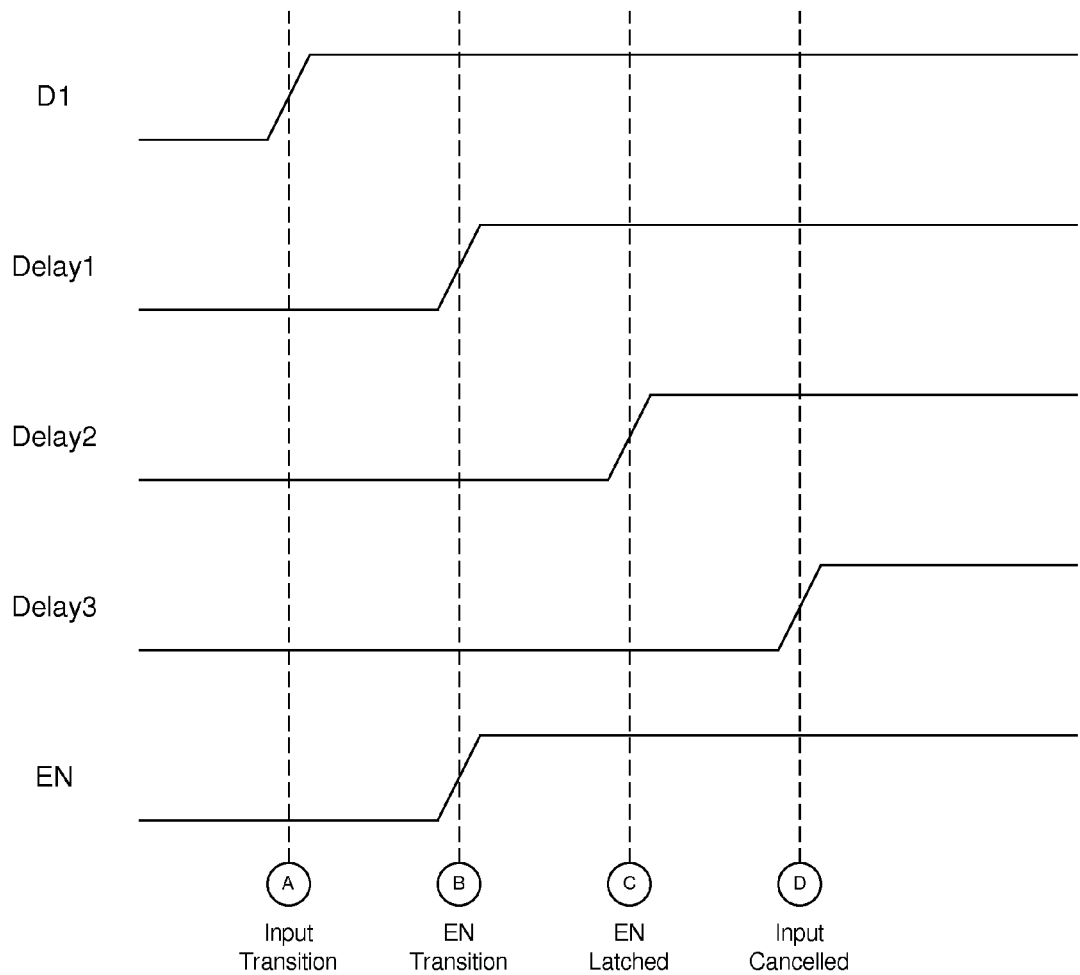
FIG. 9 illustrates a timing diagram for a PAL implementation of a circuit for performing expansion data input in an embodiment of the present invention.

One option for implementing the circuit consisting of delay element 810 and gates 820, 830 and 840 is to utilize a PAL (programmable array logic) device. FIG. 9 illustrates a timing analysis of a portion of the circuit shown in FIG. 8 when implemented in a PAL device according to the following equations:

/DELAY1=/D1

/DELAY2=/DELAY1

/DELAY3=/DELAY2

/EN=RESET+D0+(/D1*/EN)+(DELAY3*/EN)

These equations implement the equivalent of the logic elements 810, 820, 830 and 840. The internal circuitry of a PAL device constitutes a programmable AND array followed by a fixed OR array. If we model the PAL device has having a fixed combinatorial delay from input to output, the timing diagram in FIG. 9 can be derived for these equations.

The timing analysis of FIG. 9 represents an expanded view of the 00 to 10 state transition that is labeled step D in FIG. 4A and step B in FIGS. 5A and 6A. The PAL equations shown above and analyzed in FIG. 9 represent an implementation in which delay element 810 uses three PAL outputs and gates 820, 830 and 840 use a forth PAL output. If we assume that D1 goes through a low to high transition at step A in FIG. 9, then by step B, output EN will go through a low to high transition. One propagation delay later, at step C, the output EN is latched due to the feedback of EN. Finally, one propagation delay later, at step D, the output of the third delayed output goes high, which will cancel the effect of the D1 input. This point marks the end of the detection of the low to high transition on D1.

FIG. 9, and the PAL equations shown above, illustrate a conservative implementation in which there is a one propagation delay safety margin between when the delay element output goes high and when the output is positively latched. This guarantees reliable operation even in the event of variation in propagation delay time. In an alternative embodiment, only two outputs are utilized for delay element 810, and the "DELAY2" input is used in the equation of "/EN." This implementation has the advantage that it utilizes one less PAL output. In most circumstances, this will still result in a reliable and robust design in which the D1 low to high transition is latched, since D1 would be cancelled at approximately the same time that EN is latched. This requires that the propagation delay through the PAL is consistent for different outputs. In an alternative implementation, it may even be possible to utilize a single PAL output for delay element 810, although such a design may not reliably latch EN.

The present invention has been explained with reference to a number of embodiments. It can be appreciated by those of skill in the art that other embodiments are possible utilizing the concepts explained herein, thus the preferred embodiments are presented by way of example should not be considered limitations of the present invention.

The invention claimed is:

1. A method for expanding output lines in an embedded system comprising a host controller, a peripheral device, and an expansion circuit, with first and second output lines coupled to the host controller, the peripheral device, and the expansion circuit, the method comprising:
    changing a signal level of a first signal on the first output line and a signal level of a second signal on the second output line such that a direct transition is made between a first state and a second state, in order to perform output to the expansion circuit; and
    changing a signal level of the first signal on the first output line and a signal level of the second signal on the second output line such that a transition is made between the first state and a third state before transitioning to the second state, in order to perform input from or output to the peripheral device.

2. The method of claim 1 further comprising:
    generating a strobe signal on a strobe line in response to the direct transition between the first state and the second state of the first and second signals, wherein the strobe line is coupled to a clock input of a register and the register has one or more input lines coupled to one or more data output lines from the host controller.

3. The method of claim 2 wherein:
    the first state consists of the condition when the first signal is at a logic low level and the second signal is at a logic low level; and
    the second state consists of the condition when the first signal is at a logic low level and the second signal is at a logic high level.

4. The method of claim 3 further comprising setting the first signal to a logic high level before changing the logic level of the second signal in order to perform input from or output to the peripheral device.

5. The method of claim 3 further comprising:
    setting the first signal and the second signal both to a logic low level; and
    setting the second signal to a logic high level, in order to perform output to the expansion circuit.

6. The method of claim 5 further comprising setting the data output lines to a desired expansion output data before the strobe signal is generated.

7. A method for expanding input lines in an embedded system comprising a host controller, a peripheral device, and an expansion circuit, with first and second data lines coupled to the host controller, the peripheral device, and the expansion circuit, the method comprising:
    changing a signal level of a first signal on the first data line and a signal level of a second signal on the second data line such that a direct transition is made between a first state and a second state, in order to perform input from the expansion circuit; and
    changing a signal level of the first signal and a signal level of the second signal such that a direct transition is made between the first state and a third state before transitioning to the second state, in order to perform input from or output to the peripheral device.

8. The method of claim 7 further comprising:
    activating an enable signal of an enable data line in response to the direct transition between the first state and the second state of the first and second signals;
    deactivating the enable signal in response to a transition from the second state;
    wherein the enable data line is coupled to a buffer and one or more output lines of the buffer are coupled to one or more data lines of the host controller.

9. The method of claim 8 wherein:
    the first state consists of the condition when the first signal is at a logic low level and the second signal is at a logic low level; and
    the second state consists of the condition when the first signal is at a logic low level and the second signal is at a logic high level.

10. The method of claim 9 further comprising:
    setting the first signal to a logic high level before changing the level of the second signal, in order to perform output from or output to the peripheral device.

11. The method of claim 9 further comprising:
    setting the first signal and the second signal both to a logic low level;
    setting the second signal to a logic high level; and
    setting the first signal to a logic high level, in order to perform input from the expansion circuit.

12. The method of claim 11 further comprising reading the data lines before setting the first signal to a logic high level.

13. A system for expanding output lines in an embedded system, the system comprising:
    a host controller;
    a peripheral device,
    an expansion circuit, and
    first and second output lines coupled to the host controller, the peripheral device, and the expansion circuit,
    wherein the system is configured to
        change a signal level of a first signal on the first output line and a signal level of a second signal on the second output line such that a direct transition is made between a first state and a second state, in order to perform output to the expansion circuit; and
        change a signal level of the first signal on the first output line and a signal level of the second signal on the second output line such that a transition is made between the first state and a third state before transitioning to the second state, in order to perform input from or output to the peripheral device.

14. The system of claim 13, wherein the first state consists of the condition when the first signal is at a logic low level and the second signal is at a logic low level; and the second state consists of the condition when the first signal is at a logic low level and the second signal is at a logic high level.

15. The system of claim 14, further comprising:
    a strobe line and a register, wherein the register has one or more input lines coupled to one or more data output lines from the host controller and wherein the strobe line is coupled to a clock input of the register, and wherein the system is configured to generate a strobe signal on the strobe line in response to the direct transition between the first state and the second state of the first and second signals.

16. A tangible computer readable storage medium having computer-executable instructions stored thereon, the computer-executable instructions readable by a computing system comprising one or more computing devices, wherein the computer-executable instructions are executable on the computing system in order to cause the computing system to perform a method comprising:

changing a signal level of a first signal on a first output line coupled to a computing system and changing a signal level of a second signal on a second output line coupled to the computing system such that a direct transition is made between a first state and a second state, in order to perform output to an expansion device coupled to the computing system; and changing a signal level of the first signal on the first output line and the signal level of the second signal on the second output line such that a transition is made between the first state and a third state before transitioning to the second state, in order to perform input from or output to a peripheral device coupled to the computing system.

17. The tangible computer readable medium storage medium of claim 16, wherein the first state consists of the condition when the first signal is at a logic low level and the second signal is at a logic low level; and the second state consists of the condition when the first signal is at a logic low level and the second signal is at a logic high level.

* * * * *

UNITED STATES PATENT AND TRADEMARK OFFICE
CERTIFICATE OF CORRECTION

PATENT NO. : 7,606,942 B1  Page 1 of 1
APPLICATION NO. : 12/049681
DATED : October 20, 2009
INVENTOR(S) : Stephen Waller Melvin It is certified that error appears in the above-identified patent and that said Letters Patent is hereby corrected as shown below:

At column 7, line 5, please delete "FIG." and insert therefore, --FIGS.--.

At column 7, line 29, please delete "10 through 17." and insert therefore, --I0 through I7.--.

Signed and Sealed this

Thirtieth Day of March, 2010

David J. Kappos
*Director of the United States Patent and Trademark Office*